Reissued Sept. 27, 1927. Re. 16,750

UNITED STATES PATENT OFFICE.

STEPHEN J. HAYDE, OF KANSAS CITY, MISSOURI, ASSIGNOR TO AMERICAN AGGREGATE COMPANY, OF KANSAS CITY, MISSOURI, A CORPORATION OF MISSOURI.

PROCESS OF PREPARING A MATERIAL SUITABLE FOR USE IN THE MANUFACTURE OF MOLDED ARTICLES.

No Drawing. Original No. 1,255,878, dated February 12, 1918, Serial No. 178,396, filed July 3, 1917. Application for reissue filed February 28, 1919. Serial No. 279,906.

My invention relates to the process of producing an aggregate or material particularly adapted for use in the manufacture of brick, tile, terra cotta, and like molded articles and for building, paving and other purposes, from a raw material the basis of which is clay, shale, or similar argillaceous material.

One of the objects thereof is to provide an improved process of preparing material for making articles of the class or kind referred to in which raw materials unsuitable for use in the manufacture of brick and for the other purposes stated as heretofore carried on may be utilized. Another object is to provide an improved process in which the brick or other article produced is not subjected to a burning operation after it has been given its final form, shape or outline, and also in which the articles may be produced at a much less expenditure of fuel and in less time and with less labor than has heretofore commonly been the case. Other objects are to provide such other and further improvements in and relating to the art of making brick and similar molded articles from clay or equivalent argillaceous material as a basic raw material as are hereinafter pointed out and finally claimed. It is to be understood that my invention includes such variations and modifications of the preferred procedure hereinafter referred to in detail and at length as will be obvious to those skilled in the art to which my invention relates.

The basic raw material employed in making brick or analogous articles in accordance with my invention is argillaceous or clayey in character and is a material which will harden or form a clinker when subjected to a high temperature during the burning step of the process. Although the range of raw material is great and any clayey material which will form a hard mass upon being heated to a high temperature may be used, generally speaking, the raw material will be used just as it comes from the bank or deposit in which it is found. Any material containing a sufficient amount of clay or argillaceous material to harden upon being burned is suitable for use in my process, irrespective of whether or not it contains other substances or materials the presence of which would defeat the use of the raw material in ordinary brick making processes. In fact, and by way of example, a certain amount of lime producing material, and of sand, are advantageous rather than otherwise in the basic raw material employed in my process; whereas the presence of such materials in clay to be used for making brick in accordance with ordinary brick making processes is disadvantageous, and often fatal to the use of an otherwise good brick clay.

For example, the basic raw argillaceous material may be clay, shale, shale rock or like material, impregnated with or without other materials such as gravel, sand, or other substances or materials ordinarily regarded as detrimental to the use of an argillaceous material for brick making purposes in ordinary brick making processes, all depending upon the nature and composition of the natural deposit in which the said clayey material is found. The basic raw material will, during or after the mining operation in which it is removed from the original deposit, be broken up so as to pass through a screen having about a four inch mesh, the large lumps being rejected, or broken into finer particles before being used, in order to facilitate the working of my process.

The raw material is next burned in a rotary or other type of kiln at a high temperature and for a comparatively short time. This burning temperature should be in excess of 1500 degrees Fahrenheit, a temperature of from 1700 degrees to 2200 degrees Fahrenheit having been found suitable in the case of most raw argillaceous materials thus far employed in carrying out my process; and the said high temperature is maintained for the period of about two hours, as this treatment has been found to be the best suited for most raw materials. During this operation the material or the argillaceous constituent thereof is converted into hard particles and clinkers, and it assumes such a state that it will withstand the action of the elements without disintegration, and it becomes a resistant material not liable to change when the brick or other articles of which it forms the base and principal part are built into a permanent structure. The high temperature to which the material is heated eliminates all silt therefrom, and the resulting burned material consists of indurated clay, inert material not changed by the high temperature to which the raw material is subjected, and lime to the extent that lime producing material is or may be present in the raw material employed, all of which depend upon the characteristics and composition of the original material, as will be appreciated.

After the raw material has been burned as above, the same is deposited in piles and permitted to cool slowly for a period of from six to twelve hours before being crushed as will hereinafter appear. The breaking up or spontaneous disintegration of the material is prevented as much as possible during the cooling thereof so that when the same is crushed the stronger and tougher portion will go through the crusher in as large lumps as the construction of the crusher will permit, while the weaker and more friable portion of the mass will be broken into finer pieces (dependent upon the toughness of various portions of the material), whereby particles ranging in size from the coarsest which may pass through the crusher to an impalpable dust will be produced at a single crushing operation.

After the material has cooled to such an extent that the application of water thereto will not result in disintegration, and preferably before it is subjected to the crushing operation to be hereinafter referred to, water is commonly added to the material in order to slake such lime as may be present therein because of the presence of lime producing material in the basic raw material. The quantity of water thus used, however, is preferably as small as practicable, in order that the material may be dry or substantially dry when it is subjected to the next step, the crushing operation of the process. The purpose of the application of water being to slake the lime produced during the burning operation, it follows that if no lime producing materials or ingredients are present in the raw material, no water need be added. Lime or other material which will slake will, however, ordinarily be present in the burned mixture, and therefore the mixture should be treated with water before being crushed in order that the resulting lime may be thoroughly mixed with the hard material during the crushing operation, and in order to insure completeness of the slaking of the lime. The water treatment may, however, be delayed until after the crushing operation, or omitted altogether as a separate step as water is added to the material at a subsequent stage in the carrying out of my process, as will hereinafter appear.

The burned, cooled, and water treated hard material is next crushed, preferably in a dry state or condition, by means of any suitable crushing mill or device, no pains being taken, however, to reduce all the material to a uniform degree of fineness. In fact, as above stated, it is intended that the harder portions of the mass shall be as large as the mechanical construction of the crusher will allow, while the weaker portions will be broken finer by the combined action of the crusher and of the harder portions passing therethrough and will form the more finely crushed or ground portion of the crushed material. The crushing mill employed should be of such construction and so adjusted that the coarser particles will be of such size that they will pass through a screen having about a half inch mesh, and graduated down to impalpable dust. During this crushing operation and as above mentioned the slaked lime, or lime putty, becomes thoroughly mixed with the particles of crushed material, and the fineness to which the material is crushed is governed by the use to which it is to be put, some articles being best made from finely and others from coarsely crushed material, as will be appreciated.

In case my process is to be employed in the manufacture of brick, the crushed material produced as above is next mixed with Portland or other cement or lime (any kind or class of cement or lime may be used), and water, and the plastic mass thus produced formed into brick. The brick may be made by the puddling process which involves production of a thin and easily flowing mixture and the pouring or tamping of the same into suitable molds, by forming a thicker mixture and shaping the brick by means of a suitable molding machine or brick press, or otherwise, all as in present brick manufacturing operations and according to the kind of brick to be made and the choice or mechanical equipment of the maker, as will be appreciated. Also, the brick may be subjected to a repressing operation after preliminary formation thereof, if deemed desirable, the same as in brick manufacturing operations at present in use.

In case tile, terra cotta, or other shapes are to be produced the burned and crushed material is mixed with cement or lime and water to produce a mixture of proper consistency, and the composition poured into or shaped by means of molds corresponding in form with the article to be produced, as will be appreciated.

The brick or other article to be produced having thus been given their proper finish and final form the cement or lime therein is permitted to harden and bind the comminuted hard basic material into a compact mass, during which they should be wetted from time to time in order to secure a better setting and hardening action of the cement or lime. This finishing operation or step should be continued for from six to twelve days, at the end of which time the brick or other articles are ready for use.

It will be appreciated from the above that in making brick or similar molded articles in accordance with my invention the basic material or composition (the principal part of which is clay as will be appreciated) is one that has to be burned to render it suitable for use in brick making, that is, has to be burned in order to harden and convert it into a form such that it will not be acted upon by the elements when the brick produced has been built into a permanent structure, and also that the said basic material or composition is subjected to the burning process before the brick is formed therefrom, the brick being subjected to no treatment involving a high temperature after they have been given their final shape or form.

It therefore follows that in brick made in accordance with my process there is no shrinkage, cracking or distortion after molding due to a subsequent subjection thereof to a high temperature, such as occurs with bricks made in accordance with the ordinary brick making process in which the molded bricks are burned or subjected to a firing process during which they are heated to a high temperature for several days, and also that great economy so far as concerns the quantity of fuel used is secured, for brick made in accordance with the processes in common use require heating to a moderate temperature for say five days in order to dry them, and then to a much higher temperature for about the same length of time to burn or fire them—whereas in the manufacture of brick in accordance with my process, the only heating necessary is that to which the basic composition or raw material is subjected during the burning step of the process, and which is ordinarily completed in about two hours.

Another feature of great practical importance in the manufacture of brick in accordance with my process is that raw material entirely unsuited for the manufacture of brick in accordance with prior processes may be utilized. In fact, any material containing a considerable amount of clay (enough so that it will harden upon burning) may be used, and the presence of lime producing materials, gravel, sand, and various other contaminating materials, substances or ingredients which render a clay entirely unfit for brick making as ordinarily carried on, are unobjectionable in making brick in accordance with my process. In fact I prefer to use a clay or argillaceous material containing a considerable quantity of lime producing material, as the resulting lime is slaked by the application of water to the burned raw material, thus reducing the amount of cement or lime necessary to be used in preparing the material for the final molding or shaping operation which completes the brick, except for the hardening or aging step which requires time only and during which the cement or lime hardens. In ordinary brick making processes the presence of lime producing substances in the raw material is most objectionable, for, in such a case, lime will be produced during the burning or firing process (the final step in prior processes as will be appreciated) which will subsequently slake as moisture gains access thereto, thus causing disintegration of the brick, often after they have been built into a permanent structure. In my process, however, such lime as may be produced by the burning step is slaked, preferably before the burned material is crushed as above explained, and has a further opportunity to combine with water when the crushed material is mixed with cement or lime and water prior to the molding operation, so that the presence of a certain quantity of lime producing material in the raw material is advantageous rather than otherwise, as it lessens the quantity of cement or lime necessary to be used, and the treatment of the mixture or composition during the process is such that no unslaked lime could in any event persist and be present in the completed brick.

The proportions which I have found to be desirable can be based on one part of cement to six parts of the burned material after being crushed, and one part of lime putty to four parts of the crushed burned shale, either proportion to vary according to conditions and to the strength desired.

The bricks or other articles made in accordance with my invention and in the manner hereinbefore pointed out at length have been found to be well adapted to resist and withstand the action of heat, as well also as the disintegrating action of water applied to them when they are in a heated condition, as commonly happens in a fire; and it has been found in practice that they are but slightly affected by the action of heat and water at such times, and do not pop, crack, craze or disintegrate to any considerable extent under the above mentioned and similar adverse treatments or circumstances.

Having thus described and explained my invention, I claim and desire to secure by Letters Patent:

1. The process of making aggregate suitable for the manufacture of molded articles which consists in burning a raw argillaceous material containing a lime producing substance, treating said burned material with water to slake the lime present therein, and crushing the burned material.

2. The process of making material suitable for the manufacture of molded articles which consists in burning a raw argillaceous material containing a lime producing substance, treating said burned material with water to slake the lime present therein, crushing the burned material and mixing with the crushed material a material adapted to harden with water.

3. The process of making aggregate suitable for making brick or similar articles which consists in burning a raw argillaceous material containing a substance commonly regarded as detrimental in brick making processes, treating said burned material with water, before being crushed, and crushing the burned material.

4. The process of making aggregate suitable for manufacturing brick or similar articles which consists in burning a raw argillaceous material containing a substance commonly regarded as detrimental in brick making processes, slowly cooling said burned material, and crushing the burned material.

5. The process of making aggregate suitable for manufacturing brick or similar articles which consists in burning a raw argillaceous material containing a substance commonly regarded as detrimental in brick making processes, slowly cooling said burned material, treating said burned material with water, and crushing the burned material.

6. The process of making aggregate suitable for manufacturing molded articles which consists in burning a suitable raw argillaceous material at a temperature in excess of 1500 degrees Fahrenheit, for a comparatively short time, and crushing the burned material.

7. The process of making aggregate suitable for manufacturing molded aticles which consists in burning a raw argillaceous material containing a lime producing substance at a temperature in excess of 1500 degrees Fahrenheit, for a comparatively short time, treating said burned material with water to slake the lime present therein, and crushing the burned material.

8. The process of making aggregate suitable for manufacturing molded articles which consists in burning a raw argillaceous material at a temperature in excess of 1500 degrees Fahrenheit for a comparatively short time, slowly cooling said burned material, and crushing the burned material.

9. The process of making aggregate suitable for manufacturing molded articles which consists in burning a raw argillaceous material containing a lime producing substance at a temperature in excess of 1500 degrees Fahrenheit for a comparatively short time, slowly cooling said burned material, treating said burned material with water to slake the lime present therein, and crushing the burned material.

10. The process of making material suitable for manufacturing molded articles which consists in burning a raw argillaceous material containing a lime producing substance at a temperature in excess of 1500 degrees Fahrenheit for a comparatively short time, treating said burned material before being crushed with water to slake the lime present therein, crushing the burned material, and mixing cement with the crushed material.

11. The process of making material suitable for manufacturing brick or similar molded articles which consists in burning a raw argillaceous material containing a substance commonly regarded as detrimental in brick making processes at a temperature in excess of 1500 degrees Fahrenheit for a comparatively short time, crushing the burned material, and mixing cement with the crushed material.

12. The process of making aggregate suitable for manufacturing brick or similar molded articles which consists in burning a raw argillaceous material containing a substance commonly regarded as detrimental in brick making processes at a temperature in excess of 1500 degrees Fahrenheit for a comparatively short time, treating said burned material with water, and crushing the burned material.

13. The process of making material suitable for manufacturing brick or similar articles which consists in burning a raw argillaceous material containing a substance commonly regarded as detrimental in brick making processes at a temperature in excess of 1500 degrees Fahrenheit for a comparatively short time, treating said burned material with water before being crushed, crushing the burned material, and mixing cement with the crushed material.

14. The process of making aggregate suitable for manufacturing brick or similar molded articles which consists in burning a raw argillaceous material containing a substance commonly regarded as detrimental in brick making processes at a temperature in excess of 1500 degrees Fahrenheit for a comparatively short time, slowly cooling said burned material, and crushing the burned material.

15. The process of making material suitable for manufacturing brick or similar molded articles which consists in burning a raw argillaceous material containing a substance commonly regarded as detrimental in brick making processes at a temperature in excess of 1500 degrees Fahrenheit for a comparatively short time, slowly cooling said burned material, treating said burned material with water, crushing the burned material, and mixing cement or lime with the crushed burned material.

STEPHEN J. HAYDE.